(12) United States Patent
Papakonstantinou et al.

(10) Patent No.: US 11,797,518 B2
(45) Date of Patent: Oct. 24, 2023

(54) REGISTERING ADDITIONAL TYPE SYSTEMS USING A HUB DATA MODEL FOR DATA PROCESSING

(71) Applicant: Amazon Technologies, Inc., Seattle, WA (US)

(72) Inventors: Yannis Papakonstantinou, La Jolla, CA (US); Tate Andrew Certain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 144 days.

(21) Appl. No.: 17/362,743

(22) Filed: Jun. 29, 2021

(65) Prior Publication Data

US 2023/0004548 A1    Jan. 5, 2023

(51) Int. Cl.
| G06F 16/00 | (2019.01) |
| G06F 16/23 | (2019.01) |
| G06F 16/242 | (2019.01) |
| G06F 16/25 | (2019.01) |

(52) U.S. Cl.
CPC ...... *G06F 16/2365* (2019.01); *G06F 16/2448* (2019.01); *G06F 16/254* (2019.01)

(58) Field of Classification Search
CPC ............ G06F 16/2365; G06F 16/2448; G06F 16/254; G06F 3/048; G06F 16/25; G06F 16/21
See application file for complete search history.

(56) References Cited

U.S. PATENT DOCUMENTS

| 5,535,385 | A | 7/1996 | Griffin et al. |
| 6,205,451 | B1 | 3/2001 | Norcott et al. |
| 6,785,673 | B1 | 8/2004 | Fernandez |
| 6,882,993 | B1 | 4/2005 | Lawande et al. |
| 6,889,231 | B1 | 5/2005 | Souder et al. |
| 8,041,760 | B2 | 10/2011 | Mamou et al. |
| 8,554,801 | B2 | 10/2013 | Mack |
| 8,768,880 | B2 | 7/2014 | Erla et al. |
| 9,449,060 | B2 | 9/2016 | Dhayapule et al. |
| 10,628,415 | B1 | 4/2020 | Rajaperumal et al. |
| 2003/0046292 | A1* | 3/2003 | Subramanian ...... G06F 16/2393 |
| 2003/0163353 | A1 | 8/2003 | Luce et al. |
| 2004/0064456 | A1* | 4/2004 | Fong ..................... G06F 16/283 |
| 2009/0198507 | A1 | 8/2009 | Rhodus |

(Continued)

FOREIGN PATENT DOCUMENTS

| WO | 2020139079 A1 | 7/2020 |
| WO | 20210108582 A1 | 6/2021 |
| WO | WO-2021108582 A1 * | 6/2021 ........... G06F 16/219 |

OTHER PUBLICATIONS

U.S. Appl. No. 63/118,904, filed Nov. 28, 2020, Himanshu Jindal, et al.

(Continued)

*Primary Examiner* — Syed H Hasan

(74) *Attorney, Agent, or Firm* — S. Scott Foster; Kowert, Hood, Munyon, Rankin & Goetzel, P.C.

(57) ABSTRACT

A new type system may be added to a type registry for a data processing service. A request to add the new type system may be received that describes the new type system for a data store. The new type system may be used to perform a data processing job that accesses the data store to obtain or store data as a source or target data store.

20 Claims, 11 Drawing Sheets

(56) References Cited

U.S. PATENT DOCUMENTS

| | | |
|---|---|---|
| 2014/0046975 A1 | 2/2014 | Wang |
| 2014/0280028 A1 | 9/2014 | Ding |
| 2015/0081668 A1* | 3/2015 | Sankaranarayanan ............... G06F 16/2282 707/717 |
| 2015/0356494 A1 | 12/2015 | Kolesnikov |
| 2017/0068595 A1 | 3/2017 | Nautiyal et al. |
| 2017/0092060 A1 | 3/2017 | Toohey et al. |
| 2017/0154089 A1 | 6/2017 | Sherman |
| 2017/0277655 A1 | 9/2017 | Das et al. |
| 2018/0067976 A1 | 3/2018 | Schoppe et al. |
| 2018/0081905 A1 | 3/2018 | Kamath et al. |
| 2019/0019218 A1 | 1/2019 | Thompson et al. |
| 2019/0332698 A1 | 10/2019 | Cho et al. |
| 2020/0012647 A1 | 1/2020 | Johnson, III et al. |
| 2020/0012715 A1 | 1/2020 | Miller et al. |
| 2020/0110748 A1 | 4/2020 | Watzke et al. |
| 2020/0133937 A1* | 4/2020 | Cruanes ............... G06F 16/278 |
| 2020/0311043 A1 | 10/2020 | Pham et al. |
| 2020/0334230 A1* | 10/2020 | Muralidhar ............ G06F 3/0605 |
| 2020/0334232 A1* | 10/2020 | Arye .................. G06F 16/215 |
| 2020/0334239 A1 | 10/2020 | Muralidhar et al. |
| 2020/0334254 A1 | 10/2020 | Arye et al. |
| 2020/0379993 A1 | 12/2020 | Rajaperumal et al. |
| 2021/0165782 A1 | 6/2021 | Deshpande et al. |
| 2021/0165783 A1 | 6/2021 | Deshpande et al. |
| 2021/0165789 A1 | 6/2021 | Deshpande et al. |
| 2021/0165803 A1 | 6/2021 | Deshpande et al. |
| 2022/0058187 A1 | 2/2022 | Deshpande et al. |
| 2022/0171759 A1 | 6/2022 | Jindal et al. |
| 2022/0253433 A1 | 8/2022 | Deshpande et al. |

OTHER PUBLICATIONS

International Search Report and Written Opinion from PCT/US2020/062265, dated Feb. 10, 2021, pp. 1-14.

Johnson, Theodore, et al., "Update Propagation in a Streaming Warehouse," In International Conference on Scientific and Statistical Database Management 2011, Lecture Notes in Computer Science, vol. 6809, Jul. 20, 2011, pp. 129-149, Springer, Berlin, Heidelberg.

International Search Report and Written Opinion dated Sep. 8, 2022 in PCT/US2022/073001, Amazon Technologies, Inc., pp. 1-15.

* cited by examiner

REGISTERING ADDITIONAL TYPE SYSTEMS USING A HUB DATA MODEL FOR DATA PROCESSING

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the number, size and complexity of data storage and management technologies that are used to perform various operations and services, such as utilizing the features of database systems, object stores, and data streams, which in turn escalate the cost of maintaining the information. Moreover, as different data storage technologies offer different performance benefits and features, tailoring the location of data to a data storage technology that provides performance and analysis benefits for that data may result in different data sets being spread across many different locations and types of storage systems. While utilizing such a deployment strategy for individual data sets offers some benefit to the individual data sets, some systems or applications may need access to multiple different data sets in order to operate, which can be challenging given the various interfaces, languages, and other technological hurdles that occur when accessing multiple data storage systems. Thus, techniques that can obtain and co-locate data from disparate data storage systems for systems or applications that use data from the disparate storage systems, without removing the data from their optimized source storage locations, may be highly desirable.

Figure 1:
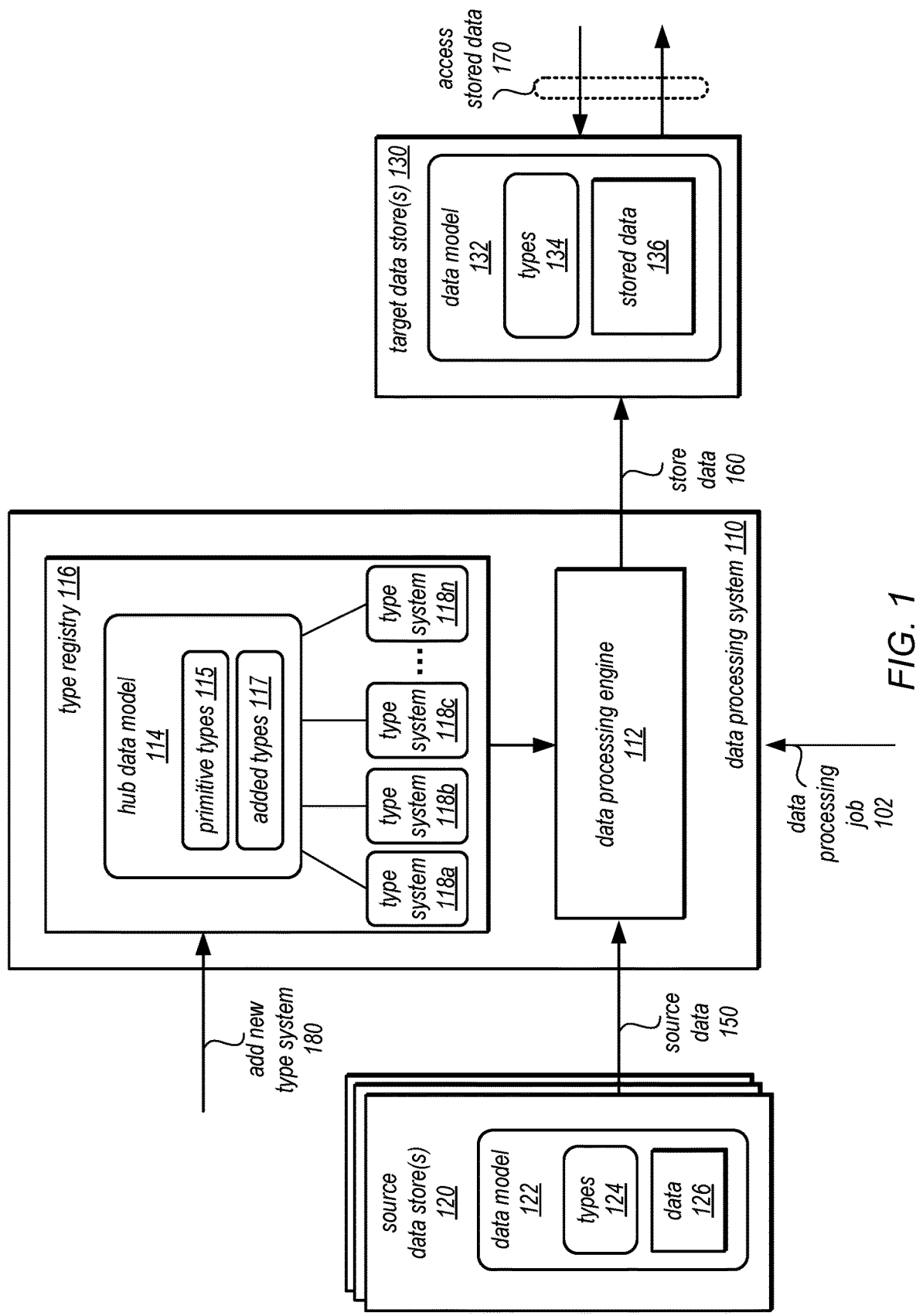
FIG. 1 illustrates a logical block diagram illustrating registering additional type systems using a hub data model for data processing, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of registering additional type systems using a hub data model for data processing are described herein. Different systems, applications, or services store data in multiple purpose-built databases or other data storage or processing technologies to ensure they use the right tool for the job at hand. However, there are many use cases that combine data from multiple such databases, data stores, or other types of data sources. For example, an application implementing an online multi-player game may need to track player profile data, player behavior, and offer in-game promotions. The application might keep player profile data in a low-latency non-relational (e.g., NoSQL) database, game events in an indexing service, player behavior analytics in a data warehouse service, and promotion catalog in a document database. To build a dashboard of top players and their game activities, an Extract Transform and Load (TEL) service could be used to set up pipelines that extract, transform, and combine data from these disparate systems into a single data store, such as a data caching service, in order to host the dashboard and do activities such as in-game promotion targeting. While such an approach may work for batch updates, keeping the dashboard updated in near real-time would have to rely upon writing significant custom code. The costs to create the custom code for complex integration and pre-computation workflows may increase as fast changing underlying data sources would cause further refinements or changes. Use cases and patterns like the example above exist in virtually every industry, decreasing system performance and increasing implementation costs.

In various embodiments, a data processing system, such as a view management system, may simplify operational workloads by making it easy to move data and/or create views (e.g., materialized or federated query results) that integrate data from multiple sources, storing these views in a specified target database, and, in the scenario for materialized views, keeping the views up-to-date in near real-time as the underlying data changes (instead of, for instance, relying upon making batch-based sets of changes). As discussed in detail below with regard to FIGS. 2-7, a materialized view management service can offer a serverless experience for client applications while also offering for high performance. For example, in various embodiments, the materialized view management service can scale automatically to ingest large volumes of source data changes and to perform computations to construct the views. Because the materialized view management service may be serverless, in some embodiments, a client application (or developers for the client application) will not have to setup infrastructure, provision capacity or configure read and write limits. The materialized view management service may instead receive a materialized view definition that specifies data sources, the integration of data from the different data sources and a target (or multiple targets) to store the materialized views. Other view management systems may be implemented, in some embodiments, that support federated querying across multiple data stores to a target data store with maintaining the view in materialized fashion (e.g., continuing to update the view).

FIG. 1 illustrates a logical block diagram illustrating registering additional type systems using a hub data model for data processing, according to some embodiments. Data processing system 110, may be a view management system, such as materialized view manage service 210 as discussed below with regard to FIGS. 2-7 implemented as part of a provider network or implemented as part of a private or on-premise network, or, in some embodiments, a view management system that can generate and store a federated a view in a specified location (e.g., for further analysis) without performing further updates, or other data processing system that moves data from source data stores to target data stores (e.g., Extract Transform Load (ETL) systems, data stream processing systems, etc.). Data processing system 110 may store data, such as data 136 (e.g., creating views, moving and transforming data, storing or reformatting data streams, and so on) from different numbers and types of source data sources 120 and store the resultant data 136 in one (or more) target data store(s) 130.

The data 136 can be accessed using the target data store, such as target data store 130 via access requests 170 (e.g., queries, data pull requests, downloads, etc.). In this way, a desired type or style of data store, for example, for integrating the stored data can be specified. The interface supported by target data store 130 may be used to access the stored data 136, in various embodiments. For example, a SQL query may be made to access data stored as a view if target data store 130 is a relational database that supports SQL. If, however, target data store 132 were stored in a non-relational database, then a request according to the programming language or interface of the non-relational database may be used to access the stored data instead. In this way, data can be deployed to targets that support the desired features for analyzing and accessing the data, in some embodiments.

Determining what data to move can be specified in various ways. A data processing job 102, for instance, can specify the source data store, target data store, and various other data processing operations that may be performed. Consider an example where the data processing job 102 is to create a materialized view. The materialized view may be specified according to a view definition that may be provided to data processing system 110, in various embodiments. For example, in some embodiments, a user interface or other type of interface (e.g. an Application Programming Interface (API)) can be used to specify the data processing job, including the desired results (e.g., scan, get, join, aggregate, etc.), sources (e.g., by selecting data sources 120 from a list of offered sources), and targets (e.g., by selecting target(s) 130 from a list of offered targets). In some embodiments, target data store 130 can be one of the data sources 120 (e.g., with the view stored in a different location, such as a different table in a same database).

In at least some embodiments, data processing job 102 can be specified in a query language (e.g., PartiQL or other structured query language (SQL)-like language). In this way, the view definition 102 can take advantage of a hub data model 114 supported by view management system 110. Hub data model 114 may be an extensible data model, in various embodiments (e.g., Ion Schema Language (ISL)) which may allow for the data models of source data store(s) 120 and target data store(s) 130 (e.g., data model 122 and data model 132 respectively) to be described (e.g., as type systems using a schema language). In this way, the respective types 124 and 134 natively supported in each target data store can be enforced via the respective descriptions of the different type systems 118 corresponding to different source data stores 120 and target data stores 130 using types of hub data model 114. For example, data processing job 102 may describe stored data 136 by including one or more mapping functions to convert a type of data 126 (e.g., a string value) into a character data type 134 of data model 132. Instead of imposing a translation burden on source data store(s) 120 or a user that submits data processing job 102 to translate from data model 122 to data model 132, the data changes 150 may be provided in a format according to hub data model 114, which in turn may allow data processing engine 112 to convert them according in a manner specified in data processing job 102 (e.g., allowing a user flexibility to identify how data 126 should be translated to data model 132 without having to specify how to translate from data model 122).

In various embodiments, data processing system 110 may implement type registry 116 to support different type systems based on hub data model 114. For example, hub data model 114 may include various primitive types 115 (e.g., STRING, INTEGER, DECIMAL, etc.). Primitive types 115 may be broad and logically unconstrained (e.g. a STRING is a string of arbitrary length). Hub data model 114 may also support an extensible list of additional types (e.g., "rdb_A_STRING", "dw_B_INT," and so on), that have been registered in type registry 114 as part of a new type system 118. For example, a request to add a new type system 180 may include a type system description (e.g., definition file), which may be written or specified in various schema or other language specifications. The request may cause a type system to be added to existing type systems, such as type systems 118a, 118b, 118c through 118n that are already present for various source data store(s) 120 and/or target data store(s) 130.

An example type system definition may be given below:

```
// Type System for the "NoSQLdb" service are prefixed with
"nsdb_"
// annotations are used for descriptive purposes, but are
not required
   (define_typesystem service::"nsdb" prefix::"nsdb"
      // The root is like the entry point for the type
definitions of the service
      // It is not named explicitly, but you can think of it
like the notion of table.
      //
      // For most systems this is a bag (table) of struct
(tuples),
      // but could be anything else...
      (root
         {
         type: bag,
         element: {
            // Since the struct is not constrained with
content:closed,
            // its content is open.
            type: struct,
            // Constraint on the serialized size of the
            // struct.
            // See notes below on soundness and tightness of
            // the type system definitions.
            encoded_byte_length: range::[1, 1MB],
            // Constraint on the length of top level attribute
            //names in NoSQLDB.
            // Other systems may have regex constraints around
            // what is allowed here.
            // and constraint on name collisions,
attribute_name: {
            utf8_byte_length: range::[1,65535]
            }
         }
      }
   )
   // definitions of named types
   (type s2048 ( ) {type: string, bytelength: range::[1,
2047]})
   (type s ( ) {type: string, bytelength: range::[1, 65535]})
   (type n ( ) // ...
   (type
   //...
   )
```

In various embodiments, the type system 118 may be for data stores that are suppliers (sources) and/or appliers (targets). In some embodiments, an applier type system may include extensions that describe the kind of views that are compatible with the target data store. Type system definitions for applier type systems may be more detailed, in some embodiments, because appliers are the most demanding on type system definitions. The supplier type systems may not need all of the features that are described for applier type systems (although such features could still be included).

An applier type system description may, in some embodiments, capture the following aspects: Do the compatible views have an open schema or a closed schema? What are the types that may appear in the compatible view and what constraints must they satisfy? Does an applier type system definition capture precisely all limitations of the target? Would a compatibility check be sound and tight? "Sound" may occur if the compatibility check says that a view schema is compatible to the target, then this view schema is indeed compatible to the target, and where "compatible to the target" may be that all data that may be described by this schema will be accepted and losslessly represented at the target. Compatibility soundness may be indicated if a compatibility check produces no false positives. "Tight" may occur if there is no view schema that is actually compatible to the target but the compatibility check fails to recognize that it is indeed compatible and calls it non-compatible. Thus compatibility tightness may occur when the compatibility check produces no false negatives.

The above notions of sound and tight useful in describing the applier type system definitions. A sound compatibility may require a sound applier type system definition. Users that specify applier type systems may strive to produce sound and tight applier type system definitions. The compatibility check may strive to infer compatibility correctly based on the applier type system definitions. In some scenarios, however, there may be constraints that will not be expressible in the applier type system definition. For example, consider the constraint "the compressed size of the tuples of this schema is compatible with data warehouse's 1 MB record size limit".

An example of an applier type system may be described as follows:

```
// "nosql_" means that the types understood by the nosqldb
applier start with nosql_
   (define_typesystem "nosqldb" "nosql_" applier
      // the root defines the type of the view itself (is it
      // open schema? closed schema?)
      (root ( )
         {type: bag,
         element:
            {// since the struct is not constrained with
               // content:closed, its content is open
            type: struct,
            // constraint on the total size of the struct;
            // see notes above on soundness and tightness of
            // the type system definitions
            bytelength: range::[1, 1MB],
            // constraint on the length of top level attribute
            // names in NoSQL DB
            // regex constraints on attribute names
            // and constraints on name collisions
attribute_name: {type: string, bytelength:
range::[1,65535]}
            }
         )
      // definitions of types
      (type nosql_s2048 ( ) {type: string, bytelength: range::[1,
2047]})
      (type nosql_s ( ) {type: string, bytelength: range::[1,
65535]})
      (type nosql_n ( ) // ...
      (type nosql_
      //...
   )
```

In some embodiments, the type system may be a supplier type system. A supplier type system may be expected to, at least, provide the definitions of the types understood by the supplier. For example, the NoSQL DB supplier type system will declare that all its types come with the prefix nosql_ and a type is the nosql_s, another type is the nosql_n, etc. The supplier will later use these types to declare the type of a NoSQL DB table and will also use them as dynamic type annotations when it sends data. An example may be described below:

```
   (define_typesystem "nosql" "nosql_" supplier
      (type nosql_s ( ) {type: string, bytelength: range::[1,
65535]})
      (type nosql_n ( ) // ...
      //...
   )
```

An additional consideration for supplier type systems may be to define if any of the following functionalities are provided by data processing system. These functionalities may include: being able to check the compatibility of attribute names that are unknown at compatibility check time against the limitations that an applier type system may have on attribute names; preparation for materialization of a table that has open schema (e.g., prepare a NoSQL DB table for materialization to Document DB); are the attribute names used at the top-level documents of NoSQL DB compatible with the attribute names used in the top-level of Document DB; are the attribute names used in the nested tuples (e.g., objects, documents, or structs) of NoSQL DB compatible with the attribute names used in the nested tuples of Document DB; and preparation for materialization of SELECT * or SELECT VALUE over a table that has open schema (e.g., materialize into an Elasticsearch store for the view). For example, this may be described as:

SELECT * FROM my_nosql_table d WHERE d.foo=3 or the view

SELECT VALUE d FROM my_nosql_table d WHERE d.foo=3

Again, in both of these cases, both the supplier type system and the applier type system may provide the constraints on attribute names because the compatibility check may determine whether the potential attribute names of my_nosql_table are compatible with the Elasticsearch store type system. If they are not compatible, a compatibility checker, as discussed below, may provide mappings to compatible names.

In scenarios, such compatibility issues may be avoided at the top level but occur within nested tuples. For example, consider this view SELECT d.pk, d.this_may_be_nested_docs FROM my_nosql—table d WHERE d.foo=3 and assume it is materialized at Document DB or Elasticsearch store or data warehouse. Are the attribute names of the nested tuples that may appear in the attribute this_may_be-nested_docs compatible with the ones of Document DB_ANY or Elasticsearch store_ANY or data warehouse_SUPER? The constraints on the attribute names of the NoSQL DB type system and of the Elasticsearch store/Document DB/data warehouse type system may, in such a scenario, be known in order resolve the compatibility issues.

As noted earlier, applier type system definitions may be more complex because they may also need to declare what is the type of the table that can be materialized in them. In particular, is the acceptable table a bag of open tuples, or it is constrained to be a bag of closed tuples? This information may be used during a compatibility check.

Consider the following. What are the constraints on attribute names used on top level tuples? For example, a data warehouse may not accept that a tuple has two attributes whose names become identical once all capitals are turned into smalls. In another example, another data store may not accept some characters in attribute names

```
(define_typesystem "nosql" "nosql_" supplier
    // type alias -- no parameterization
    (type uint2 ( ) {type: int, valid_values: range::[0, 65535]})
    // type function
    (type varchar ((N {type: int, valid_values: range::[0, 65535]}))
        {type: int, utf8_byte_length: range::[0, (param N)]})
    //...
)
```

In both of these cases, both the supplier type system and the applier type system may the constraints on attribute names because the compatibility check may determine whether the potential attribute names of my_nosql_table are compatible with the Elasticsearch store type system. If they are not compatible, then the compatibility checker may provide mappings to compatible names.

Nested tuples may also create scenarios for handling compatible name issues. For example, consider this view SELECT d.pk, d.this_may_be_nested_docs FROM my_nosql—table d WHERE d.foo=3 and assume it is materialized at Document DB or Elasticsearch store or data warehouse. Are the attribute names of the nested tuples that may appear in the attribute this_may_be-nested_docs compatible with the ones of Document DB_ANY or Elasticsearch store_ANY or data warehouse_SUPER? Constraints on the attribute names of the NoSQL DB type system and of the Elasticsearch store/Document DB/data warehouse type system may be need to be known in order to perform a compatibility check.

Applier type system definitions may be more complex because they may also need to declare what is the type of the table that can be materialized in them. For instance, is the acceptable table a bag of open tuples or it is constrained to be a bag of closed tuples? This information may be used during compatibility check. What are the constraints on the attribute names used on top level tuples? For example, a data warehouse does not accept that a tuple has two attributes whose names become identical once you turn all capitals into smalls. managed query service does not seem to accept some characters in attribute names.

```
(define_typesystem "nosql" "nosql_" supplier
    // type alias -- no parameterization
    (type uint2
    ( ) {type: int, valid_values: range::[0, 65535]})
    // type function
    (type varchar ((N {type: int, valid_values: range::[0, 65535]}))
        {type: int, utf8_byte_length: range::[0, (param N)]})
    //...
)
```

The type system registry may implement type definitions

--type definition

[<type name/type function name>, <type definition>]

Furthermore, the type registry may have type list registrations of the form

[<service name>, supplier|applier, [list of type names] ]

In some embodiments, all the types of service xyz are named xyz_NativeType. The NativeType may be the name of a type at the source and/or target. For example, nosql_s may be the nosql string because s is what NoSQL DB natively uses for string. Sometimes, the type registry may have type names that do not correspond 1:1 to the native types of the service.

In some embodiments, type registry 116 may implement an access control component so that a random user cannot delete or modify the types or type lists that the supplier/applier builders have built for their services.

In various embodiments, hub data model 114 may include primitive types 115 (e.g., string, decimal, array, integer, float, date-time, etc.) which may be practically unconstrained. For example, the data sizes of such primitive types 115 may be constrained only by processing limitations posed by data processing system 110 which may be less than the limitations imposed by source data stores 120 and target data stores 130. In some embodiments, added types 117 may be defined as structural types that are combinations of a primitive type (e.g., string, decimal) and constraints (e.g., (string) codepoint length, (string) byte length, scale, precision, value range, etc.). The schema language for hub data model 114 may be used to describe a structural type. A structural type may not have a name, some embodiments. For instance, the following may be a structural type for data warehouse's VARCHAR(10). Notice, the following description does not call out the name VARCHAR(10). Rather it defines what is known at data warehouse as VARCHAR(10).

```
type::{
   type: string,
   utf8_byte_length: range::[0, 10],
}
```

Nominal types (also referred to as logical types) may be another type of hub data model 114 which may associate a name with a structural type. When adding a new type system 180, as applier and/or supplier, a list of nominal types for the new types system may be provided. The name may be unique within the type registry, in some embodiments. Assuming that new data store "S" has a type "T", the name may be of the form S_T (e.g., datawarehouse_varchar( ). Nominal types may give the ability to different users to inspect table and view types using their preferred type nomenclature. See below the default use of this feature by the console.
typeDefNominal(<unique name>, <structural type in ISL>, <type list>)
->creates new type in registry The type system may be an optional tag. For example, a type system could be "data warehouse", thus making it easy to later find all data warehouse types.

Nominal parameterized type functions may be useful when specifying applier type systems in describing types like VARCHAR(.) and DECIMAL(.,.). For example, they are useful in declaring that data warehouse has a type datawarehouse_varchar(X), which has base type string and the parameter X is a byte length constraint with valid range 1 to 64K. They are also useful in describing types that are parameterized by other types, such as foo_list<STRING>. In some embodiments, supplier type systems may not emit nominal parameterized type functions, but instead use particular nominal parameterized types (such as mysql_varchar (20)).

An opaque type of hub data model 114 may also be used, in some embodiments. An opaque type may be used by providing a name and an underlying structural type that has enough "capacity" to represent the source data. The name may be unique within the type registry and not conflict with a primitive type name. For example, the "blob" may be an underlying type but the supplier builder may make better choices for underlying type.
typeDefOpaque(<unique name>, <structural type in ISL>)->registers new type Note that the definition of an opaque type, may appear to be similar to the definition of a nominal type: both use a name and a structural type. However, the opaque type differs from a nominal type in that query language functions and the compatibility function by default may override, and thus ignore, the structural part and treat the type as if it were a primitive.

A user case for opaque types of hub data model 14 may be that many suppliers will introduce opaque types that the query language query processor may not be able to operate on, e.g., a PartiQL processor will not have functions applicable to them. For example, Postgres GEOMETRY may not be expected to be a type that data processing system PartiQL will support. Thus, Postgres GEOMETRY will be an opaque type. The PartiQL processor may still be able to pass through a GEOMETRY as-is and this ability will be enough if both source and target are if the target applier understands GEOMETRY.

In various embodiments, the end user can inspect the type name of opaque types and cannot apply a query language function on them, other than IS and IS NULL. The end user may be unaware of the underlying type. For example, assume that the GEOMETRY has blob as an underlying type. Then consider an expression "e" of type GEOMETRY.
e IS GEOMETRY->true
e IS BLOB->false Similarly, data processing system 110 by default may not map a GEOMETRY into a BLOB just because the underlying type of GEOMETRY is a BLOB.

Some users will want be able to work with an underlying type. A query language may feature the function UNWRAP (x). When x is a value with an opaque type the unwrap returns a value whose type is the underlying structural type. For example, assume that the opaque type POINT has underlying structural type STRUCT<x: float, y:float>. Then consider a value v with type POINT and x=5.
v.x->MISSING, because the ".x" attempts to navigate into the opaque POINT
UNWRAP(v).x->5, because the UNWRAP(v) is a struct with x and thus ".x" makes sense Some users may also synthesize new opaque values with WRAP(x AS<opaque type>). This is similar to CAST except that in the case of opaque types, the structure of x may have to match the underlying structural type of the opaque type. So for example CAST({x: 10, y: 20} AS POINT) would return an opaque POINT value. In some embodiments, functions may be implemented to transform one opaque type into another type (e.g., potentially also opaque) by operating directly on the representation of the underlying structural type. For another example, assume that the NoSQL DB set type is an opaque type with the underlying type being list. This allows the use of query language constructs, such as unnesting, that apply to list. At the same time, the data is still a set and will be mapped into a NoSQL DB set, assuming there is a NoSQL DB applier. Furthermore, if one attempts to materialize a list at NoSQL DB there will be no accident where they are mapped into a set just because the underlying type is list. Furthermore, because some query languages may be "schema optional," the following distinctions can be made (1) Static Types—types that are known at table or view definition time. These types may or may not be represented (reified) at run-time. SQL, for example, may only have static types. A database schema can be considered as a representation of static type instances. (2) Dynamic Types—types that are known at run time, these types are late bound and associated with the instances of data themselves. Some query languages, like PartiQL, may be different from SQL in that they have both static and dynamic types. A dynamic type is data that has no schema, where the system has to evaluate when it operates on such data what that data represents when it gets it at runtime. Nominal and opaque dynamic types may be conveyed by Ion annotations, in some embodiments.

Data sources 120 may be many different types of data storage, processing, and/or management technologies, in some embodiments. For example, data sources 120 may be various types of databases (including relational databases, non-relational databases, graph databases, document databases, time series databases, data warehouses, or various other types of databases). In another example, data sources 120 may include various data streaming services or services (e.g., data streams for data feeds, events, or other stream processing techniques). In some embodiments, data sources 120 may be messaging, notification, or other communication services or services. Various combinations of the different example data sources may be used or combined to create a materialized view (e.g., a materialized view that joins a database table with a data stream). Similarly target data store 130 can be various types of data storage, processing, and/or management technologies, such as the examples given above.

Once data processing 110 stores data 136 in target data store 130, data processing system 110 may also data 132 (e.g., as materialized view) to provide near real-time updates, in some embodiments. In this way, data 136 may provide up-to-date changes when queries or analyzed. For example, as different changes 140 are made to (or by) data sources 120, these changes may be obtained 150 data processing system 110. For example, as discussed below with regard to FIG. 3, techniques for submitting data changes 150 as delta records in format corresponding to hub data model 114 may be performed.

Data processing system 110 may implement data processing engine 112, in various embodiments. Data processing engine 112 may perform various operations to on the captured changes and then reformat, package, encapsulate, or otherwise translate the changes to the data 136, and provide view updates 160 in a format according to hub data model 114 (e.g., via target connectors 360) which may then be translated according to data model 132 to update data 136.

Please note that the previous description of a data processing system is a logical illustration and thus is not to be construed as limiting as to the implementation of data sources, targets, views, or various other features. Different combinations or implementations may be implemented in various embodiments.

This specification begins with a general description of a provider network that implements a materialized view management service. Then various examples of a materialized view management service including different components/modules, or arrangements of components/module that may be employed as part of implementing the materialized view management service are discussed. A number of different methods and techniques to implement registering additional type systems using a hub data model for data processing are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
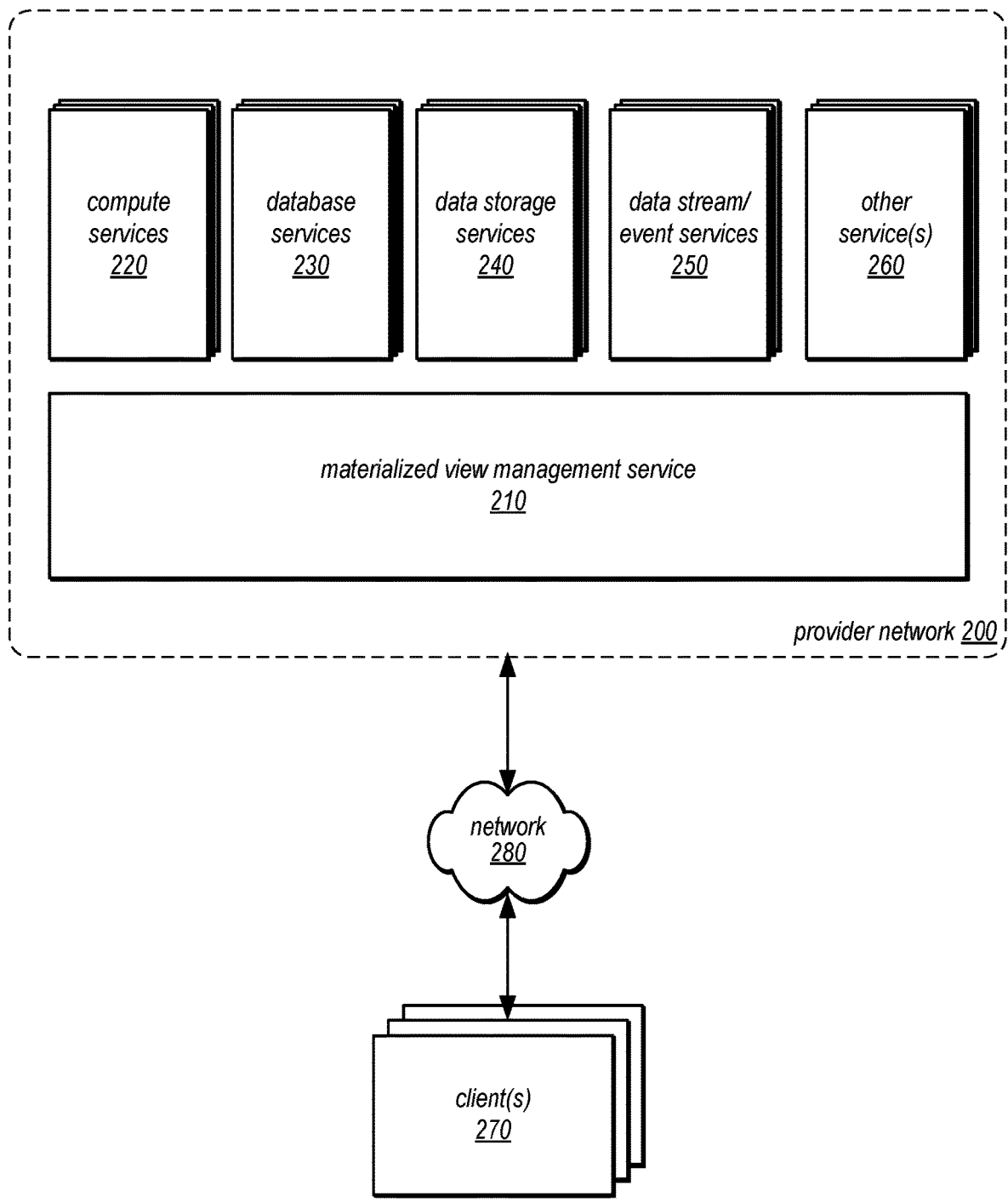
FIG. 2 is a logical block diagram illustrating a provider network offering a materialized view management service other services, including various data storage and processing services, that generates views according to received view definitions using a hub data model with registered type systems, according to some embodiments.

FIG. 2 is a logical block diagram illustrating a provider network offering a materialized view management service other services, including various data storage and processing services, that generates views according to received view definitions using a hub data model with registered type systems, according to some embodiments. Provider network 200 may be a private or closed system or may be set up by an entity such as a company or a public sector organization to provide one or more services (such as various types of cloud-based storage) accessible via the Internet and/or other networks to clients 270, in some embodiments. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 11), needed to implement and distribute the infrastructure and services offered by the provider network 200. In some embodiments, provider network 200 may implement various computing systems, services, resources, or services, such as a materialized view management service 210, compute services 220, database service(s) 230, (e.g., relational or non-relational (NoSQL) database query engines, map reduce processing, data flow processing, and/or other large scale data processing techniques), data storage service(s) 240, (e.g., an object storage service, block-based storage service, or data storage service that may store different types of data for centralized access), data stream and/or event services 250, and other services 260 (any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Compute services 210 may be implemented by provider network 200, in some embodiments. Compute services 210 may offer instances, containers, and/or functions according to various configurations for client(s) 270 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operation system or other operating environment for executing or implementing applications. A function may be implemented as one or more operations that are performed upon request or in response to an event, which may be automatically scaled to provide the appropriate number computing resources to perform the operations in accordance with the number requests or events. A number of different types of computing devices may be used singly or in combination to implement the compute instances, containers, and/or functions and of provider network 200 in different embodiments, including general purpose or special purpose computer servers, storage devices, network devices and the like. In some embodiments instance client(s) 270 or other any other user may be configured (and/or authorized) to direct network traffic to a compute instance.

Compute instances, containers, and/or functions may operate or implement a variety of different services, such as application server instances, general purpose or special-purpose operating systems, services that support various interpreted or compiled programming languages such as Ruby, Perl, Python, C, C++ and the like, or high-performance computing services) suitable for performing client(s) 270 applications, without for example requiring the client(s) 270 to access an instance. Applications (or other software operated/implemented by a compute instance and may be specified by client(s), such as custom and/or off-the-shelf software.

In some embodiments, compute instances, containers, and/or functions have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances, containers, and/or functions with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, containers, and/or functions, such as a particular number of virtual CPU cores, memory, cache, storage, as well as any other performance characteristic. Configurations of compute instances, containers, and/or functions may also include their location, in a particular data center, availability zone, geographic, location, etc. . . . and (in the case of reserved compute instances, containers, and/or functions) reservation term length.

In various embodiments, database services 230 may be various types of data processing services that perform general or specialized data processing functions (e.g., analytics, big data querying, time-series data, graph data, document data, relational data, non-relational data, structured data, semi-structured data, unstructured data, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 230 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 230 may include services that process requests to data that is not stored in fully structured storage (e.g., non-relational or NoSQL databases). Database services 230 may access the data that is semi-structured or not-structured in storage, such as data objects of unstructured or semi-structured data in a separate data storage service, in one embodiment. In other embodiments, database services 230 may locally store, managed, and access semi-structured or not-structured data.

In some embodiments, database services 220 may be various types of data processing services to perform different functions (e.g., query or other processing engines to perform functions such as anomaly detection, machine learning, data lookup, or any other type of data processing operation). For example, in at least some embodiments, database services 230 may include a map reduce service that creates clusters of processing nodes that implement map reduce functionality over data stored in one of data storage services 240. Various other distributed processing architectures and techniques may be implemented by database services 230 (e.g., grid computing, sharding, distributed hashing, etc.). Note that in some embodiments, data processing operations may be implemented as part of data storage service(s) 230 (e.g., query engines processing requests for specified data).

Data storage service(s) 240 may implement different types of data stores for storing, accessing, and managing data on behalf of clients 270 as a network-based service that enables clients 270 to operate a data storage system in a cloud or network computing environment. For example, one data storage service 230 may be implemented as a centralized data store so that other data storage services may access data stored in the centralized data store for processing and or storing within the other data storage services, in some embodiments. Such a data storage service 240 may be implemented as an object-based data store, and may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A data storage service 240 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (i SCSI).

In various embodiments, data stream and/or event services 250 may provide resources to ingest, buffer, and process streaming data in real-time. In some embodiments, data stream and/or event services 250 may act as an event bus or other communications/notifications for event driven systems or services (e.g., events that occur on provider network 200 services and/or on-premise systems or applications).

Generally speaking, clients 270 may encompass any type of client configurable to submit network-based requests to provider network 200 via network 280, including requests for materialized view management service 210 (e.g., a request to create a materialized view from different data sources of the other provider network services and identify one or more as a target data source). For example, a given client 270 may include a suitable version of a web browser, or may include a plug-in module or other type of code module that may execute as an extension to or within an execution environment provided by a web browser. Alternatively, a client 270 may encompass an application such as a database application (or user interface thereof), a media application, an office application or any other application that may make use of resources in in provider network 200 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application may interact directly with provider network 200. In some embodiments, client 270 may generate network-based services requests according to a Representational State Transfer (REST)-style network-based services architecture, a document- or message-based network-based services architecture, or another suitable network-based services architecture.

In some embodiments, a client 270 may provide access to provider network 200 to other applications in a manner that is transparent to those applications. For example, client 270 may integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 240 may be coordinated by client 270 and the operating system or file system on behalf of applications executing within the operating system environment.

Clients 270 may convey network-based services requests (e.g., materialized view creation requests) to and receive responses from provider network 200 via network 280. In various embodiments, network 280 may encompass any suitable combination of networking hardware and protocols necessary to establish network-based-based communications between clients 270 and provider network 200. For example, network 280 may generally encompass the various telecommunications networks and service providers that collectively implement the Internet. Network 280 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 280 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients 270 may communicate with provider network 200 using a private network rather than the public Internet.

Figure 3:
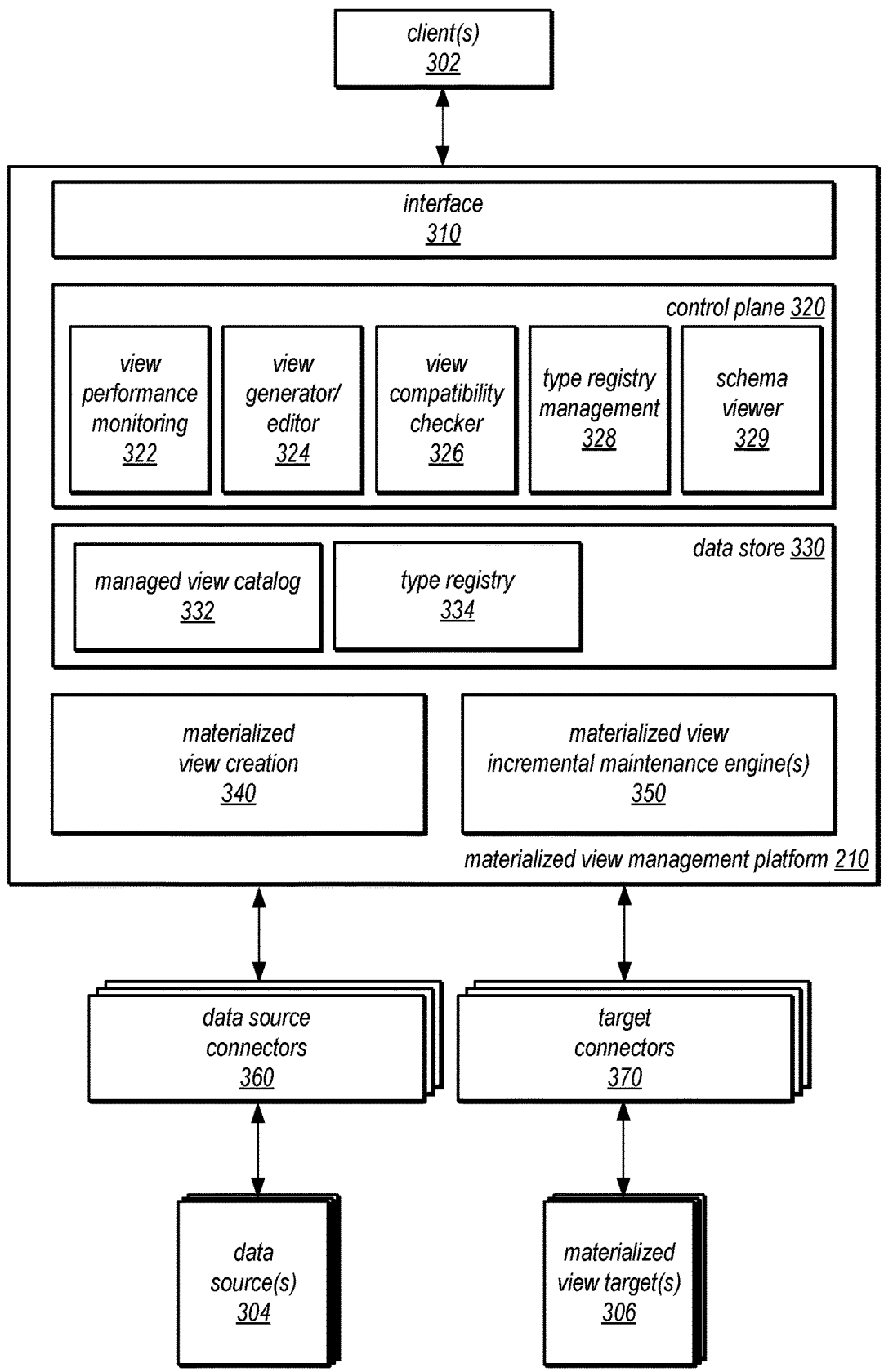
FIG. 3 is a logical block diagram illustrating a materialized view management service that implements managed materialized views created from data sources using a type registry, according to some embodiments.

FIG. 3 is a logical block diagram illustrating a materialized view management service that implements managed materialized views created from heterogeneous data sources, according to some embodiments. Client(s) 302 (which may be similar to client(s) 270 in FIG. 2 above or other types of client systems, services or applications). Client(s) 302 may access materialized view management service 210 via interface 310. Interface 310 may be a graphical user interface (e.g., implemented as a console or other graphical control view a website). Interface 310 may be implemented as a command line interface, in some embodiments. Interface 310 may be implemented as one or multiple programmatic interfaces, (e.g., one or more APIs). As discussed with regard to FIGS. 4-7, various types of requests may be received and/or responses sent via interface 310.

Materialized view management service 210 may implement control plane 320. Control plane 320 may implement various features for managing the resources and operations for creating and maintaining materialized views. For example, control plane 320 may implement various access control mechanisms or authentication techniques to ensure that requests to create materialized views are made with appropriate authorization (e.g., to create or delete a materialized view). Control plane 320 may implement various health or other system monitoring features to ensure that various features or components of materialized view management service are functioning correctly, repaired, or replaced. For example, control plane 320 may monitor a number nodes or instances used to implement view creation 340 and materialized view incremental maintenance engine(s), such as may be collected in pools or groups of instances, and replace, increase, or decrease the number of nodes or instances in order to meet demand or handle failures.

As indicated in FIG. 3, control plane 320 may implement view performance monitoring 322 in order to monitor the performance of creating and maintaining a materialized view, in some embodiments. For example, view performance monitoring 322 may collect or request performance metrics for change data capture, view computation, and view materialization to send the results to target data stores, and determine whether or not performance criteria for the view has been met. For example, performance criteria may include a lag time or other indicator for the time between when a change occurs at a source and when the change is included in an update made to a target. If the lag time exceeds a threshold amount of time (e.g., 10 minutes), then an adjustment event to reduce the lag time may be triggered. Other performance criteria may include the amount of data that is being received as a change (e.g., how many records, items or objects, or the size of data, such as 5 megabytes). Performance criteria may include criteria specified for the materialized view by a user, owner, developer, or operator via view interface 310. In some embodiments, the specified requirements may include limitations or other restrictions on the utilization of some resources (e.g., a limit on the amount of read or write load placed on a data source or target).

Control plane 320 may implement view performance adjustments to dynamically scale the resources associated with creating and maintaining a materialized view. In this way, a serverless experience can be provided, as the provisioning, management, allocation of resources may be handled by materialized view management service 210

(instead of by a user that is manually specifying the amount resources to implement for a materialized view. View performance adjustments may determine responsive actions to adjust materialized view creation and performance according to view performance monitoring 322 (e.g., according to the number and/or type of events detected). For example, view performance adjustments may increase (or decrease) the number of nodes assigned to view maintenance processing in order to keep pace with an increased number of changes received from data sources.

In various embodiments, control plane 320 may maintain, update, and/or access managed view state. Managed view state may indicate the state of various materialized views as the progress between creation and maintenance phases as well as other state information that informs operations or workflows performed on behalf of a materialized view. For example, managed view state may indicate in state information for a materialized view that the target for that the last maintenance operation to update a materialized view occurred 10 minutes ago and that another check for updates should be performed. Managed view state may identify and/or provide information for various features of materialized view creation 340 and materialized view maintenance 350.

A view compatibility checker 326 may be implemented to detect incompatibility of a view definition with target data store's type system, in some embodiments. View compatibility checker 326 could alternatively be implemented as part of materialized view creation 340 and/or as part of run-time evaluations of materialized view incremental maintenance engine(s) 350. Type registry management 328 may support requests to add or update type systems stored in type registry 334 as discussed in detail above with regard to FIG. 1 and below with regard to FIG. 5. Schema viewer 329 may allow for type inspection according to different types as described below with regard to FIGS. 7 and 9.

Materialized view creation 340 may handle requests to create a materialized view. For example, materialized view creation 340 may perform initial validation of a view, such as checking the string length and basic structure. In some embodiments, materialized view creation 340 may generate maintenance or other execution plan to create and update the materialized view. In some embodiments, materialized view creation 340 may store the maintenance or other execution plan along with other artifacts to facilitate the materialized view in managed view catalog 332. In some embodiments, materialized view creation 340 may assign, provision, or initiate a materialized view incremental maintenance engine 350 to handle a materialized view (e.g., to obtain changes, generate view updates and store view updates to an out-bound log for the materialized view. Materialized view creation 340 may provide materialized view incremental maintenance engine(s) 350 assigned to a materialized view with the appropriate information (e.g., identifier for generated maintenance plan, identities of input and output logs for the data source(s) and target for the materialized view, etc.).

In various embodiments, data store 330 may be implemented as part of materialized view management service 210. For example, materialized view management service 332 may implement a managed view catalog 332. Managed view catalog 332 may store information related to materialized views, including a name, definition, access controls or configuration, maintenance and/or other historical information to indicate the progress or performance of a materialized view (e.g., last time updated). Managed view catalog 332 may store various state information or other metadata, such as metadata to describe the mappings between change logs for in-bound changes from source connector(s) 360 and out-bound changes to target connector(s) 370.

Materialized view management service 210 may support via interface 310 various APIs or other implement data source connectors 360, in various embodiments. Data source connectors 360 may communicate with and obtain changes from data source(s) 304. In some embodiments, a data source connector 360 may facilitate a change capture protocol or interface for a particular type of data store (e.g., a My SQL connector, a data stream connector, an object store connector) for a corresponding one of data source(s) 304. In some embodiments, data source connectors 360 are implemented as part of a service or storage system implement data source(s) 304. As discussed above data source(s) 304 can be various services (or resources hosted within services) of provider network 200.

For example, data source connectors 360 may enable a changed data capture stream supported by a source database, and register as a recipient, authorized reader, or other component capable of obtaining updates to that source as a change stream. In some embodiments, the data source may be a data stream, and thus the data source connectors 360 may register or request to be a recipient of the data stream. In some embodiments, change data capture may poll for source changes. For example, data connector(s) 360 may record or maintain the state of previously received changes from a source (e.g., by timestamp, version identifier, etc.) and use the state to request changes that occurred since the last received state. The changes captured by data source connectors may be sent via interface 310 to a source-specific change log (e.g., an append-only change log implemented via a log-based database, ledger database, or other log-structured storage) in a format corresponding to the hub data model (e.g., in ION format) via which materialized view incremental creation engines 350 may read from the logs of corresponding sources contributing to a view.

Source connectors 360 may report source progress or performance information to control plane 320. In this way, control plane 320 can make performance determinations to adjust the performance of connectors, in some embodiments.

In some embodiments, materialized view increment maintenance engine(s) 350 may obtain a maintenance plan or other execution plan for updating a created materialized view from data store 330 (although in other embodiments a maintenance or other execution plan may be generated by materialized view incremental maintenance engine(s) 350). A maintenance plan may describe the various operations for combining changes to various updates received from the data sources to provide an updated view without regenerating the entire materialized view (e.g., without re-querying all sources to obtain all of the materialized view information). In some embodiments, view maintenance processing nodes may implement maintenance plan optimization to rewrite or utilize various features, such as intermediate results stored in intermediate tables and/or utilization local computational capabilities and storage, such as maintenance computation data (instead of using source computational storage and/or capabilities). In this way, view maintenance processing nodes can adapt to the capabilities of the data sources (e.g., supported or unsupported processing operations, such as supporting or not supporting joins, aggregations, etc.) or limitations on the data sources (e.g., read or write limitations on the data sources).

Materialized view incremental maintenance engine(s) 350 may implement maintenance plan execution. In some embodiments, view maintenance plan execution may be a query engine or processor that can perform the maintenance plan to obtain the changed data (as well as other data needed to make the update). If, for instance, a change is to a value that is joined with other data sources, then even if the other data sources are unchanged, the change may still need to be joined with the data from the unchanged sources, so a query may be performed to obtain that unchanged data from the data sources (or in the event it is stored as part of maintenance computation, the local copy can be utilized). Materialized view incremental maintenance engine(s) 350 may store records (e.g., in hub data model format) to an outbound log of changes specific to the materialized view, in some embodiments.

In some embodiments, materialized view incremental maintenance engine(s) 350 may rely upon external computation resources (e.g., compute function resource as discussed above with regard to FIG. 2 of compute services 220), which may perform an operation or determine a value used as part of updating a materialized view. Similarly, some data or query operations can be performed by data source resources, and thus queries, such as query 662, may be performed as part of determining updates to a materialized view.

In some embodiments, materialized view incremental maintenance engine(s) 350 may report progress and performance information to control plane 320. In this way, control plane 320 can evaluate the performance of operations to determine updates and make adjustments to scale the resources allocated to maintaining the materialized view to satisfy performance criteria.

In various embodiments, materialized view management service 210 may implement an interface 311 which may support requests or other interactions with target connector(s) 370. Target connector(s) 370 may connect to and interact with a target for a materialized view. Similar to a data source connector 360, a target connector 370 can be respectively implemented for different types of targets (e.g., a target connector for a data warehouse or a target connector for a NoSQL database). As discussed above materialized view target(s) 306 can be various services (or resources hosted within services) of provider network 200. In some embodiments data source(s) 304 and/or materialized view target(s) 306 can be implemented partially or completely external to provider network 200 (e.g., at an on-premise network or at another provider service network). In some embodiments, materialized view management service 210 may allow for custom or user-implemented target or source connectors to be provided (e.g., uploaded via an interface and deployed for a requested materialized view) to customize the change data capture or materialized view export (e.g., from on-premise or custom data sources or targets).

Once changes to a materialized view have been computed from the changes of a data source (e.g., from delta log records received in the one or more inbound logs for the corresponding data sources 304), then changes to the materialized view may be materialized by materialized view management service 210. For example, materialized view incremental maintenance engine(s) 350 may store the updates to a view-specific change log (e.g., an append-only change log implemented via a log-based database, ledger database, or other log-structured storage) in a format corresponding to the hub data model (e.g., in ION format) via which target connectors 370 implemented in the target data store service (or implemented interact specifically for the target data store) may read from the logs of corresponding sources contributing to a view. Target connectors 370 may be implemented to interact with a target for a materialized view by applying the described changes to the materialized view.

For example, target connector(s) 370 may obtain the changes to be made to a materialized view, in various embodiments. In various embodiments, target connectors 370 may implement target-specified update translation. For example, target-specific update translation from the hub data model may be performed, including data type conversions, operation conversions, and/or generate the request parameters needed to perform an update request to make a corresponding change in the materialized view according to the interface of the target system. In some embodiments, target connector(s) 370 may enforce ordering constraints. In some embodiments, target connector(s) 370 may perform deduplication to prevent duplicate updates from being performed. For example, target connector(s) 370 may track the updates successfully performed (as discussed above) in order to prevent a failure from causing an already performed update from being re-performed.

Figure 4:
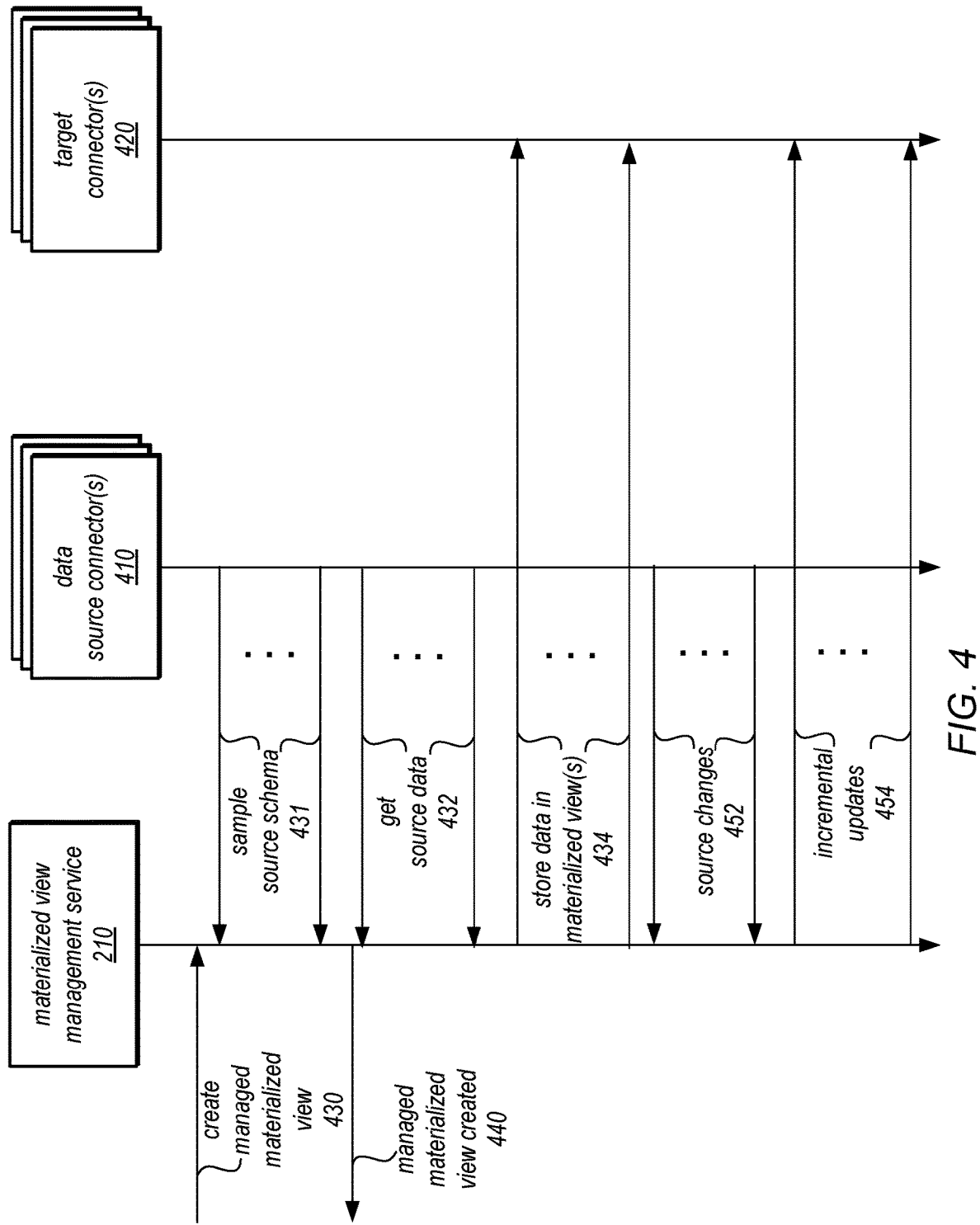
FIG. 4 is a sequence diagram illustrating interactions for creation and maintenance phases for a materialized view managed by a materialized view management service, according to some embodiments.

Materialized view management service 210 may operate in different phases for a materialized view, in some embodiments. FIG. 4 is a sequence diagram illustrating interactions for creation and maintenance phases for a materialized view managed by a materialized view management service, according to some embodiments. For example, creation phase 402 may begin with a request to create a materialized view 430 received at materialized view 210 (e.g., via interface 310). The creation request 430 may include or specify the data source(s), data target(s), and view definition that the materialized view is to provide, in some embodiments. In some embodiments, the creation request may provide the access credentials (e.g., user id, password, etc.) or other permissions to allow the creation of the materialized view and update of the materialized view in the target. In some embodiments, an identity and access management service may coordinate authentication of materialized view management service and other services for creation and maintenance of a materialized view.

In some embodiments, a graphical interface may provide options of selectable data sources, operations to perform to determine a result from the selectable data sources, and selectable targets to which materialized view management service 210 is capable of accessing. Once the various materialized view definition parameters are selected, a create user interface element may be selected, which triggers the "create managed materialized view request 430" (using the selected parameters and result definition). Alternatively an API may utilized, allowing for a query language or other notation (e.g., JSON, ION, etc.) to specify the data source(s), target(s), and result definition. Similar parameters or inputs can be provided by a command via a command line interface.

Materialized view management service 210 may receive the request 430 and invoke the various features of a view creation process or workflow. For example, materialized view management service 210 may get source data from the data source connector(s) 410 (e.g., via the append-only log or an initial batch upload, snapshot, or other information used to generate the initial version of the materialized view). In some embodiments, a data source may push the data (e.g., a stream of data) to materialized view management service 210. Alternatively, some data sources may allow for materialized view management service 210 to query or send requests to access the desired data for the materialized view (e.g., according to a result set definition for the materialized view). Materialized view management service 210 perform one or multiple requests to store the materialized view(s) 434 via target connector(s) 420, in various embodiments. For example, materialize view management service 210 may store change log records or other information to an append-only log assigned to the materialized view and accessible to target connector(s) 420.

The requests to get source data 432 and store data 434 may continue until the materialized view is created. Then, the materialized view may begin maintenance phase 404. Maintenance phase 404 may allow for materialized view management service 210 to get 452 (e.g., via the append-only logs for the various data sources) or otherwise respond to changes to the data sources (e.g., additional data, removed data, modified data, etc.) in order to compute or otherwise determine an update to a materialized view. For example, if a materialized view provides an aggregation function (e.g., summary, average, count, deviation, etc.) then materialized view management service 210 may add, divide, subtract, union, join, or other perform various other operations to determine updated values corresponding to the obtained changes. Materialized view management service 210 may then perform one or more requests to update the new version(s) of the materialized view(s) 454 to include those changes at via target connector(s) 420 (e.g., via updates to the append only log for the materialized view).

Figure 5:
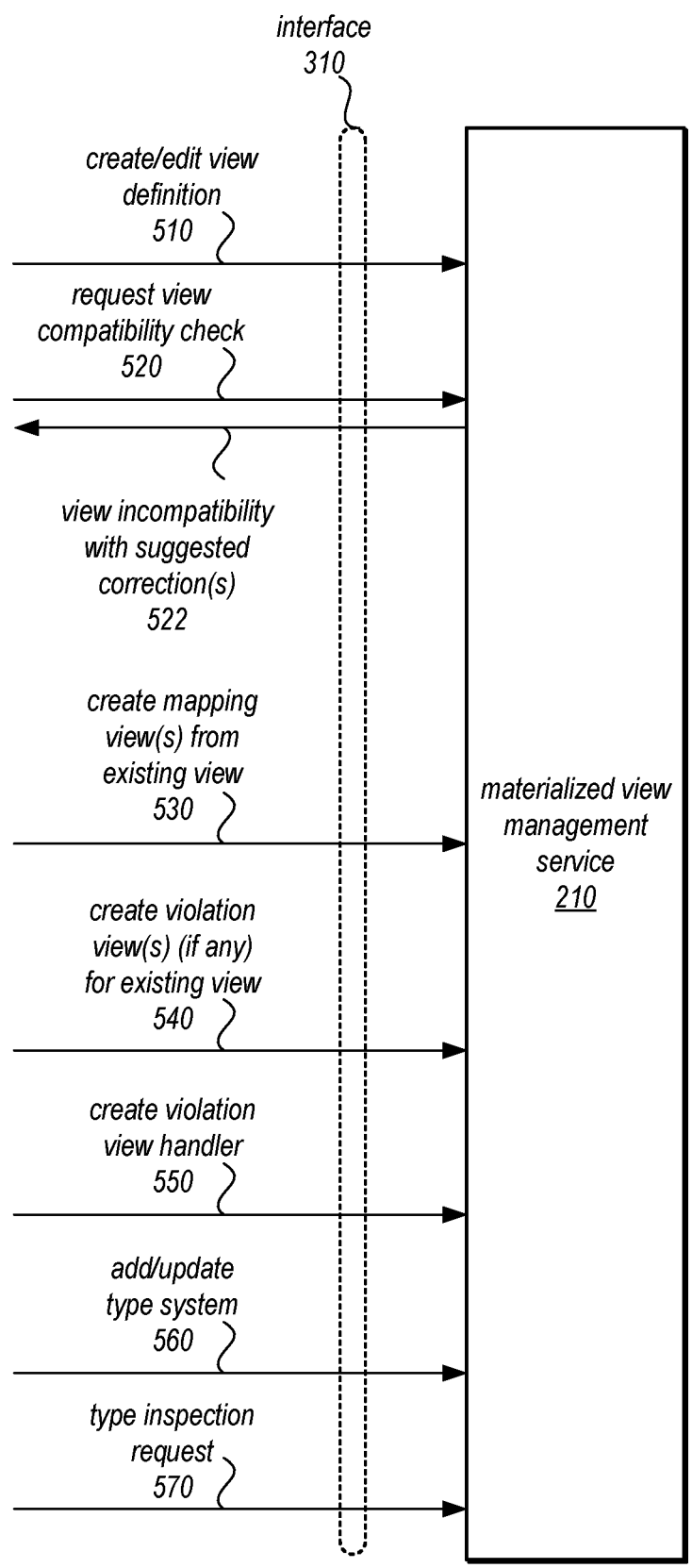
FIG. 5 is logical block diagram illustrating interactions supported by an example interface for a materialized view management service, according to some embodiments.

Various requests or interactions with a materialized view management service may be supported to configure creation and maintenance of materialized view and/or obtain information for materialized views. FIG. 5 is logical block diagram illustrating interactions supported by an example interface for a materialized view management service, according to some embodiments. As indicated at 510, a view definition may be created and edit 510 via interface 310. For example, the view definition may be entered via text editor, command line, and/or uploaded as a document (e.g., a JSON document). As indicated at 520, interface 310 may support a request to perform a compatibility check for a view definition, as discussed above with regard to FIG. 1 and below with regard to FIGS. 6-8. An indication of incompatibility (or no compatibility issues) may be provided, as indicated at 522. In some embodiments, the response indicating incompatibility may include suggestions.

Figure 9:
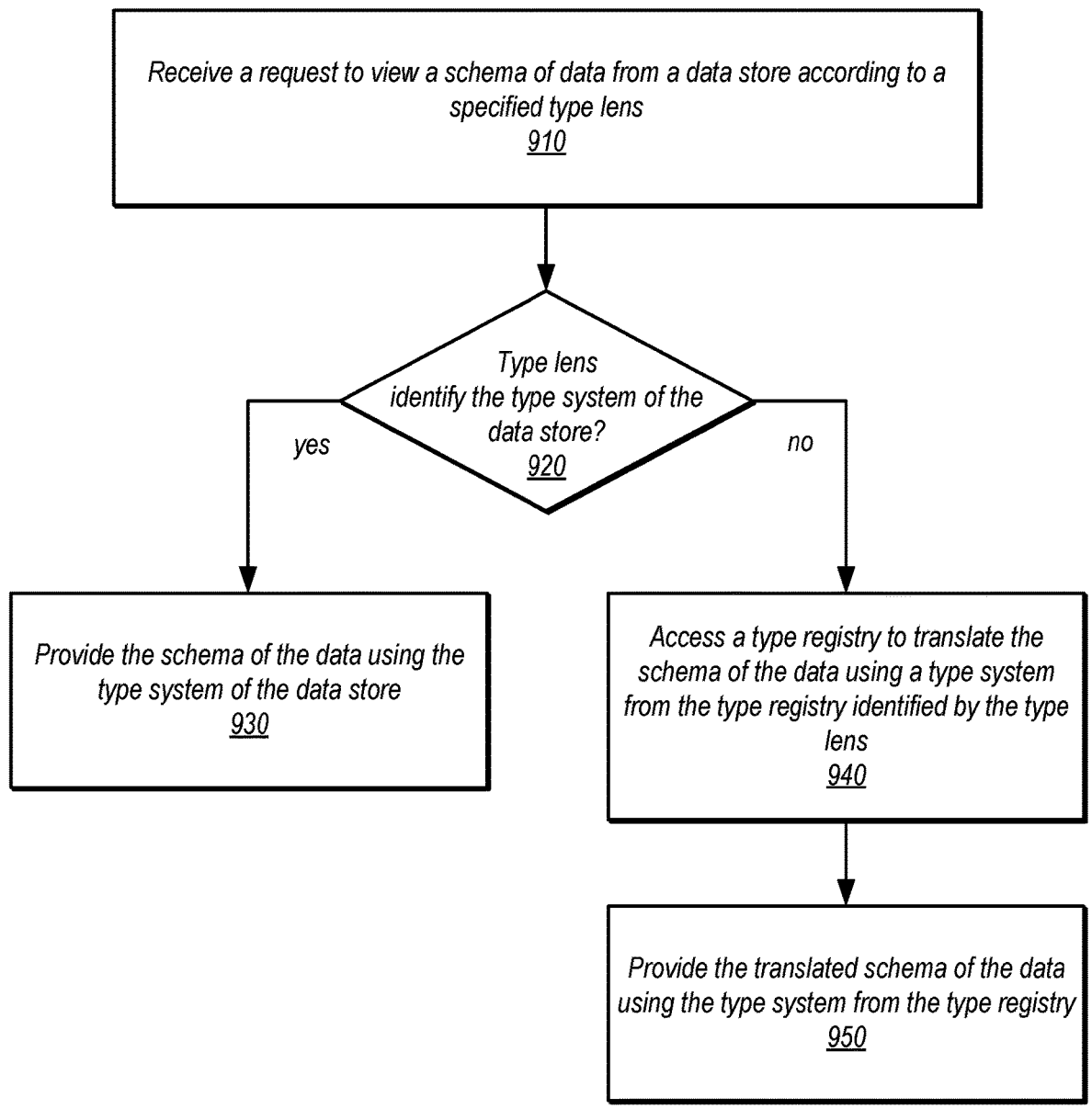
FIG. 9 is a high-level flowchart illustrating various methods and techniques to inspect type of a data schema according to a specified type lens, according to some embodiments.

As indicated at 530, one or more mapping view(s) may be created from existing view(s), as discussed below with regard to FIG. 9. For example, a user may have created a view V. A user may want to target an additional database, DB2 and thus creates the mapping view M as:
 CREATE VIEW M AS
 SELECT CAST(d AS DECIMAL(10,2)) AS d
 CAST(a AS DB2::SUPER) AS a
 CAST(s AS VARCHAR(256)) AS s
 FROM V
The DB2::SUPER type may be DB2's equivalent of ANY. An alternative to mapping view M may specify the mapping view with a schema on read functionality:
 CREATE VIEW SM
 FROM V
 AS SCHEMA (
 d DECIMAL(10,2),
 a DB2::SUPER,
 s VARCHAR(256)
 )

In some embodiments, one (or more) violation views may be created, as indicated at 540. A violation view may be created in various embodiments which may result in a logical violation when moving data from a source data store to a target data store (e.g., by losing some data or exhibiting an unusual schema). For example, if in the creation of the above map view, a user suspects that there are a few "d's" that cannot be cast to decimal and would like to keep track of them, as SUPER if possible, along with the associated s, a violation view may be created:
 CREATE VIEW Violating_d AS
 SELECT CAST(s AS VARCHAR(256)) AS s,
 CAST(d AS DB2::SUPER) AS d
 FROM V
 WHERE FAIL CAST(d AS DECIMAL(10,2))
 //the FAIL CAST can be emulated as NOT IS MISSING d AND
 //IS MISSING CAST(d AS DECIMAL(d))

In some embodiments, violations may be handled as part of a materialized view maintenance engine 350 in FIG. 3 or other component, which may report or send a notification that a violation has occurred, insert or add records to a violation view, among other techniques. For example, a request to create a violation view handler 550, which may be implemented, as discussed in detail below with regard to FIG. 6. The violation view handler may be described using a script, language, or other set of instructions that may specify the various responsive actions related to violation views, for instance.

As discussed above, a type system may be added or updated, as indicated at 560. For example, a description of a type system may be received that specifies the various features of the type system, open, closed, applier, supplier, etc., using types of the hub data model (e.g., primitive, struct, nominal, opaque, etc.) Similarly, as discussed in detail below with regard to FIG. 7, type inspections may occur. In some embodiments, updates to a type system may trigger notifications or other workflows to identify impacted views (e.g., materialized, mapping, or violation). For example, a change to a type system to reflect a change in a data stores implementation of a data type (e.g., the data type size could be increased), may affect whether a violation occurs or if a different mapping to a different type should be applied.

Figure 6:
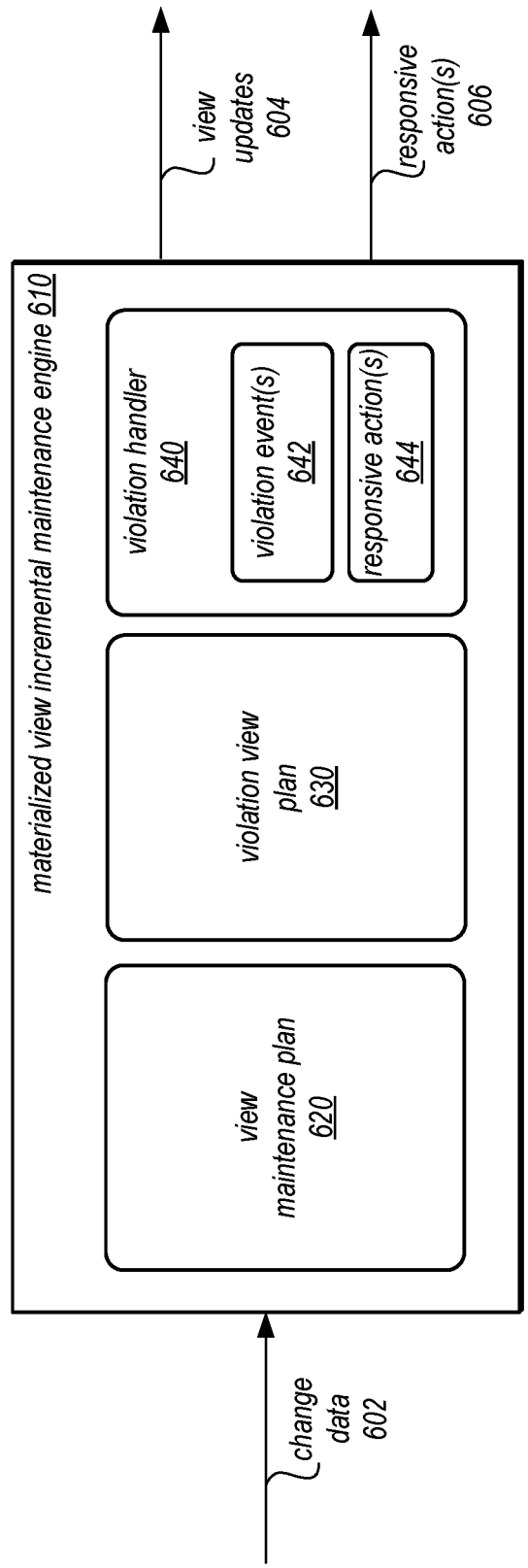
FIG. 6 is a logical block diagram illustrating a materialized view incremental maintenance engine that implements a violation handler for managed materialized views, according to some embodiments.

FIG. 6 is a logical block diagram illustrating a materialized view incremental maintenance engine that implements a violation handler for managed materialized views, according to some embodiments. Materialized view incremental maintenance engine 610 may receive change data 602 and make view updates 604 according to view maintenance plan 620 (generated from a view definition) and, when violations occur, updates to a violation view, according to violation view plan 630 (generated from a violation view). A violation handler 640 may be specified as various scripts, components, or other criteria for different violation event(s) 642 that may trigger different responsive actions 644 (e.g., notifications, data processing, such as error correction, stop view maintenance, aggregation of violations, particular storage location for a violation view, such as the same location as a materialized view, etc.). Materialized view maintenance engine 610 may perform the responsive actions 606.

Figure 7:
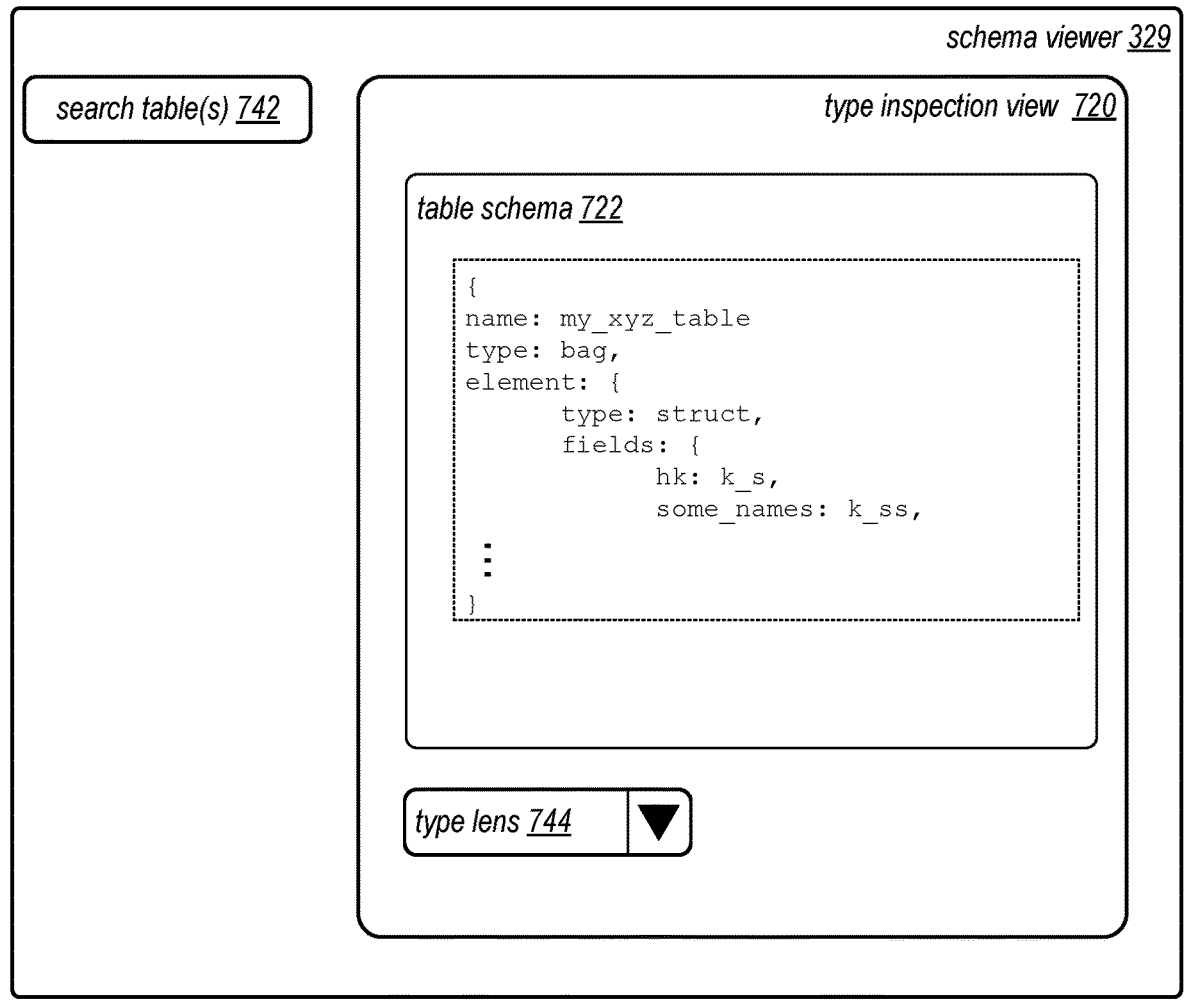
FIG. 7 is an example user interface for viewing data schemas with a type lens, according to some embodiments.

FIG. 7 is an example user interface for viewing data schemas with a type lens, according to some embodiments. For example, schema viewer 329 may provide an interface for users to search for table(s) 742 or other data, that is stored according to a data model of a data store that implements a respective type system. Type inspection view 720 may provide a schema view for the table, as indicated at 722, which may be modified or translated according to different schemas according to type lens 744 (e.g., other available type systems of other data stores). Because the other type systems are described using types of the hub data model, such translations to provide a view of a table schema using a different type lens 744 can be performed (e.g., similar to compatibility checks and view generation as discussed above).

Figure 8:
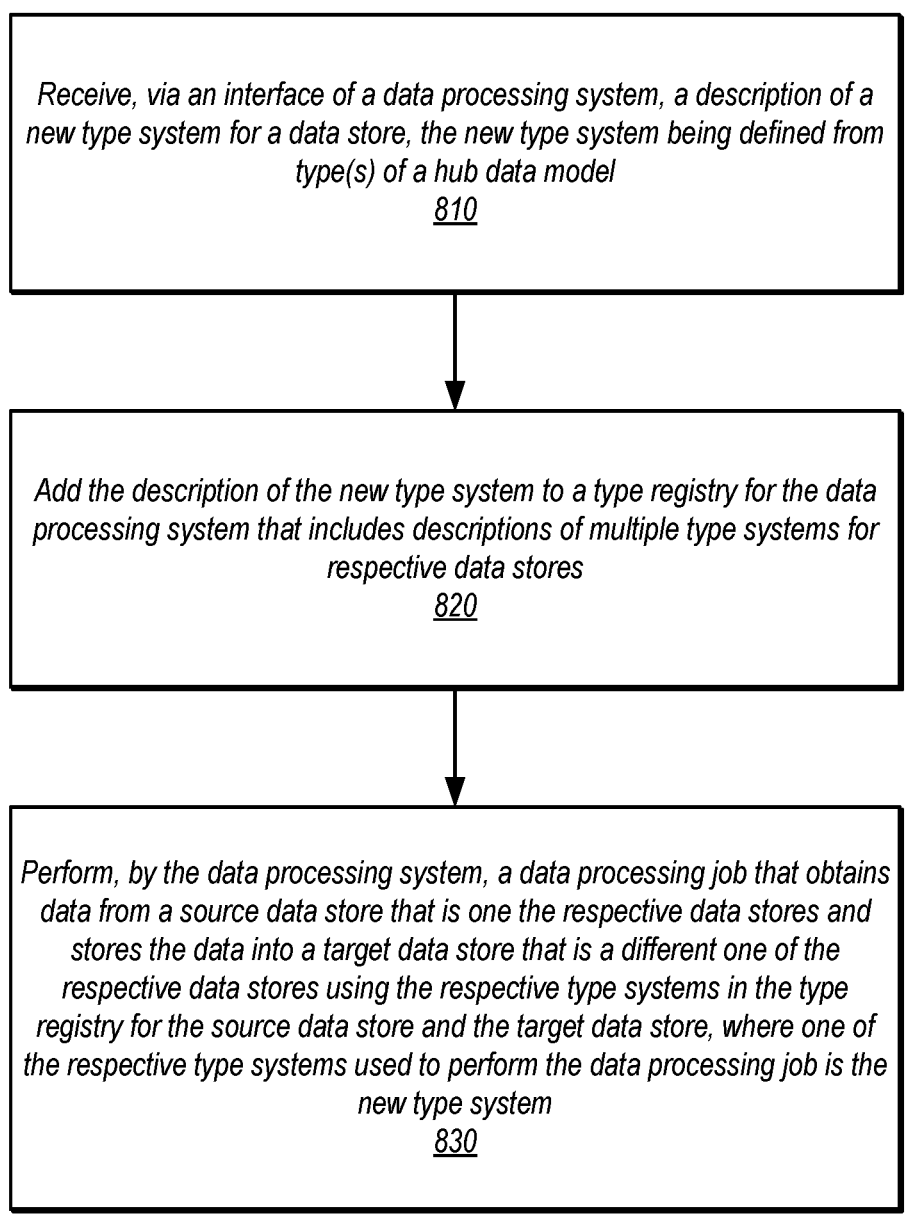
FIG. 8 is a high-level flowchart illustrating various methods and techniques to implement registering additional type systems using a hub data model for data processing, according to some embodiments.

Although FIGS. 2-7 have been described and illustrated in the context of a provider network implementing a materialized view management service, the various components illustrated and described in FIGS. 2-7 may be easily applied to other data processing systems that store data across different sources and targets. As such, FIGS. 2-7 are not intended to be limiting as to other embodiments of a system that may implement registering type data systems to extend a hub data model for data processing. FIG. 8 is a high-level flowchart illustrating various methods and techniques to implement registering additional type systems using a hub data model for data processing, according to some embodiments.

Various different systems and devices may implement the various methods and techniques described below, either singly or working together. For example, a materialized view management service such as described above with regard to FIGS. 2-8 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 810, a description of a new type system for a data store, the new type system being defined from one or more types of a hub data model, may be received via an interface for a data processing system, in some embodiments. For example, as discussed above with regard to FIG. 1, a hub data model may include different primitive or other types that can be used to define new types in a new type system. These other types may include struct types, (or other types that support combinations of types), nominal types, and/or opaque types. The hub data model may be described in a schema language, such as ISL. Thus, the description of the new type system being defined from types of the hub data model may also be described in the same schema language, in some embodiments.

As indicated at 820, the description of the new type system may be added to a type registry for the data processing system that includes descriptions of multiple type systems for respective data stores. In some embodiments, access controls or other processing of the description of the types system may be implemented before adding the description to the type registry. For example, an access control may only allow certain users or requests to add a new type system that are associated with (or include) valid credentials indicating authorization to add the new type system. In another example, type system validation may be performed to parse, scan, or otherwise evaluate the description of the new type system for improper format, incorrect syntax, or other errors.

As indicated at 830, a data processing job may be performed that obtains data from a source data store that is one the respective data stores and stores the data into a target data store that is a different one of the respective data stores using the respective type systems in the type registry for the source data store and the target data store, where one of the respective type systems used to perform the data processing job is the new type system. As discussed above with regard to FIG. 1, adding new type systems to the type registry may allow for new data stores to serve as sources or targets for data processing jobs. Instead of requiring a developer to specify the mappings of a source data store into each possible target data store, the type systems of the source and targets in the registry can be used to map data from one type system to another (as both are defined using types of the hub data model).

Because a hub data model will allow for different type systems to be involved in a data processing job, it may be beneficial for some users of a data processing system to view or otherwise be provided with a schema of data from a data store (e.g., a table schema describing the number of columns, names of columns, data types of columns, etc.). FIG. 9 is a high-level flowchart illustrating various methods and techniques to inspect the type of a data schema according to a specified type lens, according to some embodiments. As indicated at 910, a request may be received to view a schema of data from a data store according to a specified type lens, in some embodiments. For example, the request may include a parameter or other identifier that specifies one of a plurality of available type systems in a type system registry. A determination may be made as to whether the type lens identifies the type system of the data store, as indicated at 920. For example, if the type lens specified matches the storage location of the data, then it can be determined that the type lens identifies the types system of the data store. If not, then the type lens may identify a different types system.

If yes, then the schema of the data may be provided using the type system of the data store, as indicated at 930. The schema may be obtained as-is from the data store utilizing an interface, instruction, or other command to access the data schema. If not, then a type registry may be accessed to translate the schema of the data using a type system from the type registry identified by the type lens, as indicated at 940. For example, the data schema may be obtained, as discussed above, and then the data types specified in the schema may be remapped to their corresponding types in the type system corresponding to the type lens. As indicated at 950, the translated schema of the data using the type system may be provided from the type registry. Providing translated schemas according to the type lens may allow a user to understand how data may be mapped to different potential target data stores. Moreover, a user can also understand those scenarios in which alternative mappings could be suggested or specified when specifying a data processing job (e.g., a view definition).

Figure 10:
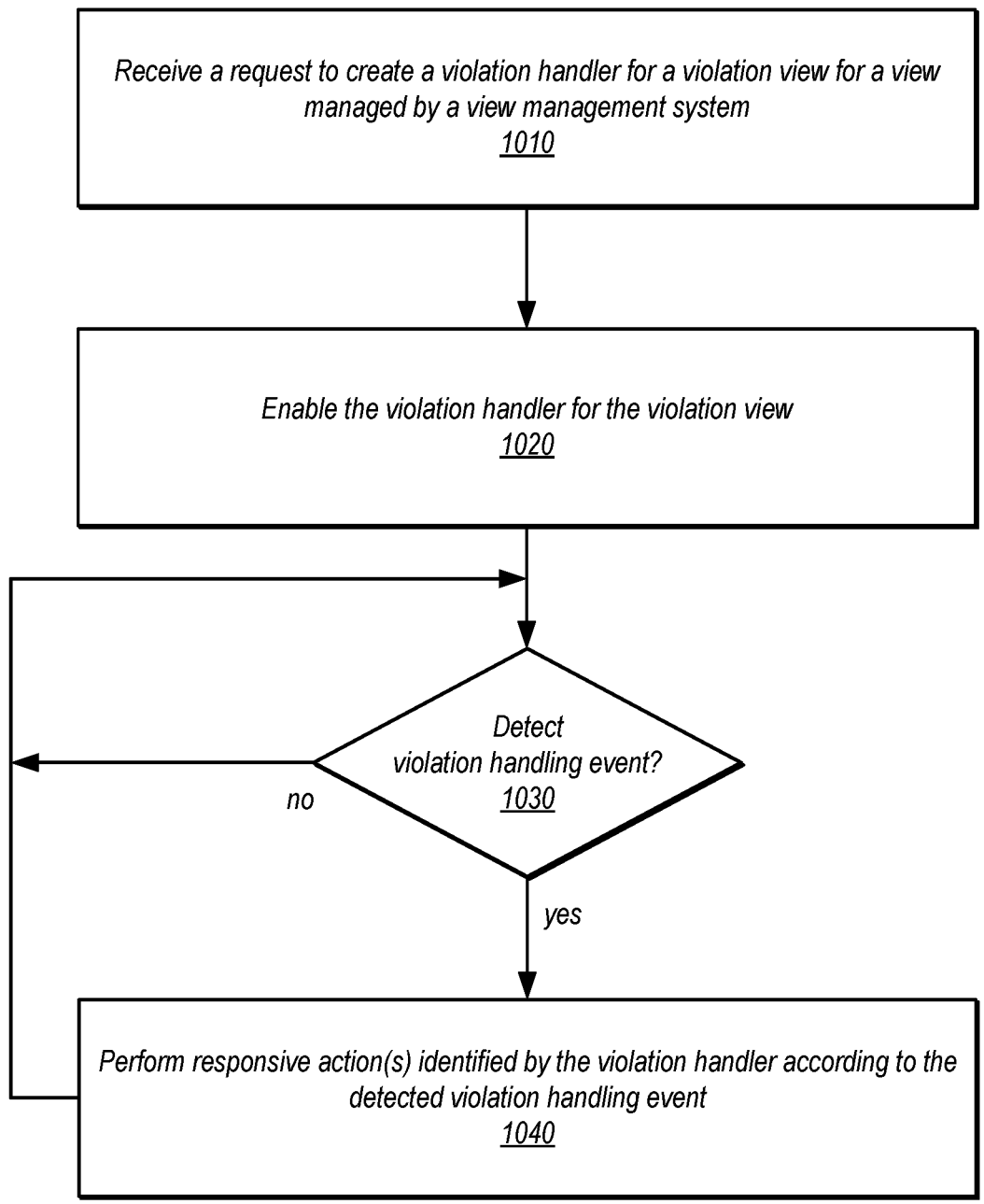
FIG. 10 is a high-level flowchart illustrating various methods and techniques to implement a violation handler for a managed view, according to some embodiments

As discussed above, when a violation view is created to capture violations of maintaining a materialized view, different ways to handle the captured violations may be beneficial in different scenarios. Giving users the flexibility to specify how violations may be handled, may allow users to better design applications that integrate materialized views generated using a data processing system that implements a hub data model. FIG. 10 is a high-level flowchart illustrating various methods and techniques to implement a violation handler for a managed view, according to some embodiments. As indicated at 1010, a request may be received to create a violation view handler for a violation view managed by a view management system, as indicated at 1010. For example, the violation view (or multiple violation views) may be identified in the request along with various conditions or other criteria that trigger one or more responsive actions. Aggregation of violation views, for example may occur, as can transformation of those views via different mathematical or other operators to generate different view performance metrics may be specified. Other specified responsive actions may include actions to notify or alert different systems, and/or may provide a mechanism for stopping materialized view maintenance.

As indicated at 1020, the violation handler for the violation view may be enabled. For example, monitoring resource(s), such as one or more computing devices, or portions thereof (e.g. monitoring processes or threads) may be provisioned or assigned to check for violation handling events, in some embodiments.

As indicated at 1030, a violation event may be detected. Different criteria for different violation handling events may be implemented. For example, threshold values with respect to the number of violations, type of violations, and/or source of violations may be considered. As indicated at 1040, responsive action(s) identified by the violation handler may be performed according to the detected violation handling event, in some embodiments. For example, the violation handler may include a mapping between different violation handling events and different responsive actions. A violation handling event may trigger more than one responsive action, in some embodiments, such as both an alert of a violation and an action to stop updating a materialized view. Violation handler may be enabled until a request to disable or update the violation handler is received, in some embodiments.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 11:
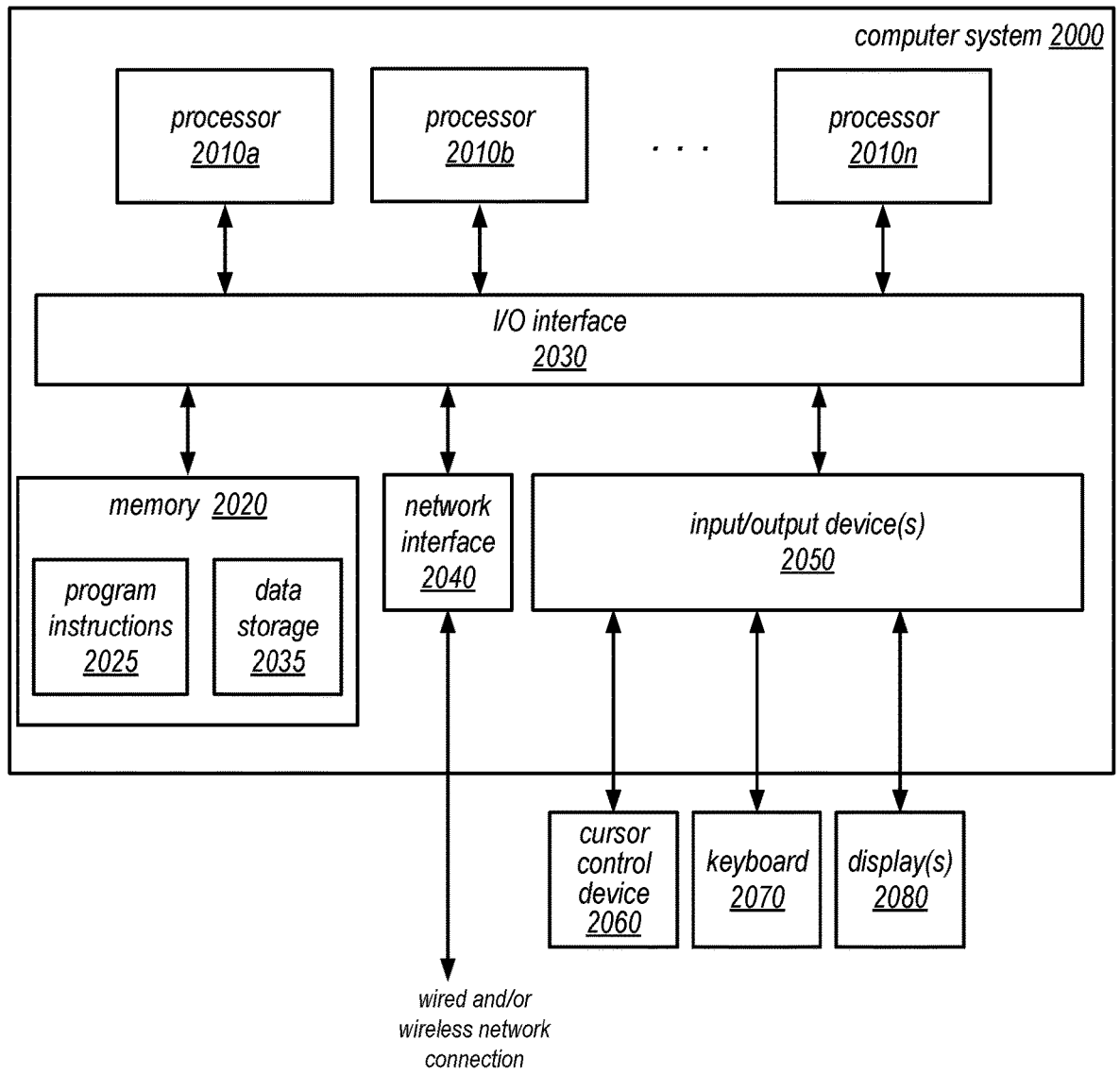
FIG. 11 illustrates an example system configured to implement the various methods, techniques, and systems described herein, according to some embodiments.

Embodiments of registering additional type systems using a hub data model for data processing as described herein may be executed on one or more computer systems, which may interact with various other devices. One such computer system is illustrated by FIG. 11. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 11, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    at least one processor; and
    a memory, storing program instructions that when executed by the at least one processor, cause the at least one processor to implement a view management system, the view management system configured to:
        receive, via an interface of the view management system, a description of a new type system for a data store, wherein the description of the new type system is defined from one or more types of a hub data model;
        store the description of the new type system in a type registry for the data processing system, wherein the type registry comprises respective descriptions of a plurality of type systems for respective data stores;
        receive a view definition that specifies a first data store of the data stores as a source data store; and
        generate a view according to the view definition, wherein to generate the view, the view management system is configured to:
            obtain source data from the source data store to generate the view to store in a target data store that is a second data store of the data stores;
            access the type registry to use a first type system of the plurality of type systems that is for the source data store and use a second type system of the plurality of type systems that is for the target data store;
            translate between a first data model for the source data store and a second data model for the target data store to store the view in the target data store according to the second data model; and
            wherein one of the first type system or the second type system used to generate the view is the new type system.

2. The system of claim 1, wherein the new type system is an applier type system for the target data store.

3. The system of claim 1, wherein the view management system is further configured to:
    receive a request to view a schema of data from the source data store according to a specified type lens, wherein the specified type lens identifies the new type system, and wherein the new type system is the respective type system for the target data store;
    access the type registry to translate the schema of the data using the new type system in the type registry; and
    provide the translated schema of the data using the new type system.

4. The system of claim 1, wherein the view management system is implemented as a materialized view management service offered by a provider network, wherein the source data store is one service offered by the provider network, and wherein the target data store is a different service offered by the provider network.

5. A method, comprising:
    receiving, via an interface of a data processing system, a description of a new type system for a data store, wherein the description of the new type system is defined from one or more types of a hub data model;
    adding the description of the new type system to a type registry for the data processing system, wherein the type registry comprises respective descriptions of a plurality of type systems for respective data stores; and
    performing, by the data processing system, a data processing job that obtains source data from a source data store that is a first data store of the respective data stores and stores processed data into a target data store that is a second data store of the respective data stores, comprising:
        accessing the type registry to use a first type system of the plurality of type systems that is for the source data store and use a second type system of the plurality of type systems that is for the target data store;
        translating between a first data model for the source data store and a second data model for the target data store to store the processed data in the target data store according to the second data model; and
        wherein one of the first type system or the second type system used to perform the data processing job is the new type system.

6. The method of claim 5, wherein the new type system is a supplier type system for the target data store.

7. The method of claim 5, further comprising:
    receiving a request to view a schema of data from the source data store according to a specified type lens, wherein the specified type lens identifies the new type system, and wherein the new type system is the respective type system for the target data store;
    accessing the type registry to translate the schema of the data using the new type system in the type registry; and
    providing the translated schema of the data using the new type system.

8. The method of claim 5, further comprising updating the new type system in the type registry responsive to a request to update the new type system received via the interface.

9. The method of claim 5, wherein the description of the new type system indicates that the new type system is an open type system.

10. The method of claim 5, wherein the new type system is applied to perform a compatibility check between a source data model and a target data model before performing the data processing job.

11. The method of claim 5, wherein the description of the new type system includes a primitive type of the hub data model.

12. The method of claim 5, wherein the data processing system is implemented as an Extract Transform Load (ETL) service offered by a provider network, wherein the source data store and the target data store are located within the provider network.

13. The method of claim 5, wherein the data processing job is to maintain a materialized view at the target data store according to a view definition specified in a query language.

14. One or more non-transitory, computer-readable storage media, storing program instructions that when executed on or across one or more computing devices cause the one or more computing devices to implement:
>  receiving, via an interface of a data processing system, a description of a new type system for a data store, wherein the description of the new type system is defined from one or more types of a hub data model;
>  storing the description of the new type system in a type registry for the data processing system, wherein the type registry comprises respective descriptions of a plurality of type systems for respective data stores;
>  generating, by the data processing system, a plan to perform a data processing job that obtains source data from a source data store that is a first data store of the respective data stores and stores the data into a target data store that is a second data store of the respective data stores, wherein the plan to perform the data processing job comprises operations that:
>  > access the type registry to use a first type system of the plurality of type systems that is for the source data store and use a second type system of the plurality of type systems that is for the target data store;
>  > translate between a first data model for the source data store and a second data model for the target data store to store the processed data in the target data store according to the second data model; and
>  > wherein one of the first type system or the second type system used to perform the data processing job is the new type system; and
>  executing, by the data processing system, the plan to perform the data processing job.

15. The one or more non-transitory, computer-readable storage media of claim 14, wherein the new type system is an applier type system for the target data store.

16. The one or more non-transitory, computer-readable storage media of claim 14, storing further instructions that when executed on or across the one or more computing devices, cause the one or more computing devices to further implement:
>  receiving a request to view a schema of data from the source data store according to a specified type lens, wherein the specified type lens identifies the new type system, and wherein the new type system is the respective type system for the target data store;
>  accessing the type registry to translate the schema of the data using the new type system in the type registry; and
>  providing the translated schema of the data using the new type system.

17. The one or more non-transitory, computer-readable storage media of claim 14, wherein the description of the new type system indicates that the new type system is a closed type system.

18. The one or more non-transitory, computer-readable storage media of claim 14, wherein the new type system is applied to perform a compatibility check between a source data model and a target data model before performing the data processing job.

19. The one or more non-transitory, computer-readable storage media of claim 14, wherein the description of the new type system comprises a structural type that combines two or more primitive types of the hub data model.

20. The one or more non-transitory, computer-readable storage media of claim 14, wherein the one or more computing devices are implemented as part of a materialized view management service, and wherein the data processing job is to maintain a materialized view at the target data store according to a view definition specified in a query language.

* * * * *